US009010519B2

(12) United States Patent
Handschick et al.

(10) Patent No.: US 9,010,519 B2
(45) Date of Patent: Apr. 21, 2015

(54) METHOD AND CONVEYOR DEVICE FOR RETURNING EMPTIES, IN PARTICULAR BOTTLES AND CANS

(75) Inventors: Bert Handschick, Obersdorf (DE); Johann Löning, Oldenburg (DE)

(73) Assignee: Envipco Holding N.V., Amersfoot (NL)

( * ) Notice: Subject to any disclaimer, the term of this patent is extended or adjusted under 35 U.S.C. 154(b) by 541 days.

(21) Appl. No.: 13/125,015

(22) PCT Filed: Oct. 20, 2009

(86) PCT No.: PCT/EP2009/007507
§ 371 (c)(1),
(2), (4) Date: Jul. 11, 2011

(87) PCT Pub. No.: WO2010/046085
PCT Pub. Date: Apr. 29, 2010

(65) Prior Publication Data
US 2011/0259714 A1    Oct. 27, 2011

(30) Foreign Application Priority Data
Oct. 20, 2008    (DE) .......................... 10 2008 052 330

(51) Int. Cl.
*B65G 47/00*    (2006.01)
*B07C 5/12*    (2006.01)
(Continued)

(52) U.S. Cl.
CPC ............. *B07C 5/122* (2013.01); *B65G 47/1471* (2013.01); *B65G 2201/0244* (2013.01); *G07F 7/0609* (2013.01)

(58) Field of Classification Search
USPC ............... 198/393, 395, 396, 397.01, 397.02, 198/397.06, 464.1, 464.2, 464.3
See application file for complete search history.

(56) References Cited

U.S. PATENT DOCUMENTS 2,702,112 A * 2/1955 Hait ............................... 198/395
3,282,394 A * 11/1966 Neal et al. ..................... 198/396
(Continued)

FOREIGN PATENT DOCUMENTS

CA    948142 A1    5/1974
DE    2254791 A1    5/1974
(Continued)

OTHER PUBLICATIONS

International Search Report dated Jan. 27, 2010 for International Application No. PCT/EP2009/007507.

*Primary Examiner* — Leslie A Nicholson, III
(74) *Attorney, Agent, or Firm* — Shlesinger, Arkwright & Garvey LLP

(57) ABSTRACT

The present invention relates to a method for returning empties, in particular bottles and cans, having a bulk input, in which the empties (10) are moved from an input space (8) past a detection unit (14) by a conveyor device (1) rotating about the longitudinal axis thereof, and further having a conveyor device for implementing said method, comprising a plurality followers mounted transversely to the direction of conveyance and spaced a distance apart. An increased throughput is to be achieved with such a method and such a conveyor device. This is achieved in that the empties (10) are parallelized out of the input space (8) by the conveyor device (1) and fed to the detection unit (14) in a field array, or in that each follower (4) is designed to be wide enough to hold at least two empties (10) side by side, and that an angular momentum is applied to the empties (10) at least in the detection field (15) of the detection unit (14).

44 Claims, 2 Drawing Sheets

(51) Int. Cl.
  *B65G 47/14* (2006.01)
  *G07F 7/06* (2006.01)

(56) References Cited

U.S. PATENT DOCUMENTS

| | | | | |
|---|---|---|---|---|
| 3,300,021 A | * | 1/1967 | Holmes | 198/382 |
| 3,331,486 A | * | 7/1967 | Towry | 198/380 |
| 3,580,380 A | * | 5/1971 | Phillips | 198/395 |
| 3,598,222 A | * | 8/1971 | Mencacci | 198/417 |
| 3,835,985 A | * | 9/1974 | Johnson | 198/397.06 |
| 4,285,426 A | | 8/1981 | Cahill | |
| 4,928,808 A | * | 5/1990 | Marti | 198/397.06 |
| 5,052,543 A | * | 10/1991 | Hagan | 198/396 |
| 5,078,258 A | * | 1/1992 | van der Schoot | 198/384 |
| 6,678,578 B2 | * | 1/2004 | Holmen et al. | 700/223 |
| 6,691,854 B1 | * | 2/2004 | De Greef | 198/395 |
| 8,729,455 B2 | | 5/2014 | Kulki et al. | |
| 8,813,938 B2 | | 8/2014 | Handschick | |
| 8,910,567 B2 | | 12/2014 | Moch et al. | |
| 2007/0158163 A1 | * | 7/2007 | Kritzinger et al. | 198/397.06 |
| 2011/0259714 A1 | | 10/2011 | Handschick et al. | |
| 2012/0017782 A1 | | 1/2012 | Moch et al. | |
| 2012/0118700 A1 | * | 5/2012 | Handschick | 198/370.11 |
| 2012/0260811 A1 | | 10/2012 | Schulenberg et al. | |
| 2013/0248716 A1 | | 9/2013 | Kulcke | |
| 2013/0299304 A1 | | 11/2013 | Handschick | |
| 2014/0048391 A1 | | 2/2014 | Beyer | |

FOREIGN PATENT DOCUMENTS

| | | |
|---|---|---|
| EP | 0 082 735 | 6/1983 |
| EP | 0 290 877 | 11/1988 |
| EP | 1 953 674 | 8/2008 |
| EP | 2105891 A | 9/2009 |
| GB | 981 328 | 5/1961 |
| WO | WO 00/63853 A | 10/2000 |
| WO | WO 2005/069233 | 7/2005 |

* cited by examiner

METHOD AND CONVEYOR DEVICE FOR RETURNING EMPTIES, IN PARTICULAR BOTTLES AND CANS

CROSS-REFERENCES

This application claims priority to PCT International Application No. PCT/EP09/07507, filed Oct. 20, 2009, which is incorporated herein by reference.

DESCRIPTION

1. Technical Field

The present invention relates to a method and a conveyor device for the return of empties, especially of bottles and cans.

2. Background

Such methods and conveyor devices as the ones described here are used in automatic systems for the return of empties. Disposable containers and reusable containers in the form of bottles and cans are returned with the aid of these automatic systems. A distinction is made here between individual draw-in systems and bulk draw-in systems.

An example of a system for the return of empties with an individual draw-in system can be found in WO 02/12095 A1. In such automatic systems, the containers are manually input, one after the other, adjacent to each other and then conducted in a row, still adjacent to each other, by a conveyor device. The conveyor device conducts the containers past a detection unit that checks the containers for form, nature, and integrity, as well as for barcodes or special figures.

Automatic systems for the return of empties with a bulk draw-in system are described in DE 10 2005 025 965 A1, DE 10 2004 010 133 A1, and DE 103 35 188 A1. In these automatic systems, empties to be returned are not input individually, i.e., item by item, but rather in a mass (bulk), i.e., as loose material. The mass of empties is placed in the input space, and then the individual empties are transported out of the input space by the conveyor device. In the automatic systems of the prior art, a serial individualization of the empties takes place, and the containers are removed from the input space as in the individual draw-in system. That is, the conveyor device transports the containers, one after the other, past a detection unit that detects the empties individually.

SUMMARY

The bulk draw-in systems previously described above have the advantage that the input of the empties into the system takes place rapidly and without problems for a user. There is, however, the disadvantage that the throughput through the automatic system requires too much time on account of the serial individualization of the empties in spite of high individual conveyor speeds in some instances, so that a customer must wait a relatively long time for the printout of a deposit slip.

The present invention advantageously provides a method and a conveyor device for the return of empties, in particular of bottles and cans, with an elevated throughput.

A method is disclosed to solve this problem, in which the empties are moved out of an input space by a conveyor device rotating the containers about their longitudinal axis past a detection unit. Thus, the empties are moved out of the input space in a parallelized manner and supplied to the detection unit in a field array.

A system is also disclosed to solve this problem, the system including a conveyor device which moves empties out of an input space, rotates the containers about their longitudinal axes past a detection unit. The conveyor device moves the empties out of the input space in a parallelized manner and supplies the containers to the detection unit in a field array. The conveyor device, in certain embodiments, includes several cams arranged transversely to the direction of transport. The cams are also constructed so that the empties receive a rotary impulse, causing the empties to rotate at least in the detection field of the detection unit.

Therefore, the removal of the empties from the input space takes place in a parallelized manner so that the empties are supplied to the detection unit in a field array. The term "field array" is intended to signify that the empties, viewed on the conveyor device in the direction of transport, are arranged not only in front of and behind one another, but also side by side at the same time. In order to realize this method of procedure, the cams of the conveyor device are constructed to be so wide that they can receive at least two items of empties adjacent to one another, whereby the empties receive a rotary impulse at least in the detection field of the detection unit in each transport plane formed by the cams so that the empties rotate about their longitudinal axis with a simultaneous translatory transport. The rotary movement about the longitudinal axis is required, as in the individual draw-in system, in order to be able to detect marks, etc. present on the jacket surface of the empties by the detection unit. Based on these measures, the throughput of the empties through an automatic return system is significantly elevated.

In a first advantageous embodiment of the invention the conveyor device is provided with a contact surface for the empties. Drives, especially chain drives, run around this contact surface, on which rollers, arranged at a distance from each other, are rotatably supported and function as cams for the empties. The rotary drive of the empties lying on the rollers can be achieved in a simple manner by frictional contact of the rollers with the contact surface. That is, rollers are moved translatorily relative to the contact surface and rotate as a result, transmitting a rotary impulse onto the empties. A rotary drive of the rollers by a positive locking between rollers and support is also conceivable in that the support comprises toothed areas on both sides, with which gear combs on the rollers may mesh in such a manner that they rotate in unison.

In another embodiment of the invention the rollers project beyond the contact surface on both sides and rest on rails in these projecting areas for the rotary drive under frictional contact or positive locking. The rails are arranged, relative to the contact surface, on the opposite side of the chain drive. As a result, the direction of rotation of the rollers, and therefore also of the empties, is inverted in comparison to the previously described embodiment, which advantageously results in a shortening of the height of the detection field of the detection unit. A further shortening of the height of the detection field of the detection unit can be realized in this embodiment in that the diameter of the rollers (or in a positive locking, of the gears) in the two projecting areas is smaller than in the cam area, whereby the term cam area denotes the area of the rollers on which area the empties lie. This measure significantly raises the circumferential speed of the empties.

In contrast to the embodiment described above as the first advantageous embodiment, a shortening of the detection field of the detection unit can be achieved when the rollers project on both sides beyond the contact surface and rest on rails in these projecting areas. The rails provide the rotary drive using either frictional contact or positive locking. The rails are arranged, relative to the chain drives, on the side of the contact surface, and the diameter of the rollers (or in the case of positive locking, of the gears) is smaller in the projecting areas than in the cam area of the empties. In this embodiment, the empties have the same direction of rotation as in the first embodiment, but have a greater circumferential speed.

It proved to be advantageous if the rollers have alternating sections with greater and lesser diameters, whereby the empties rest on sections with a greater diameter. The conveying of the empties then has fewer problems. In particular, the empties are less likely to get wedged between the rollers and the contact surface with this shape of the rollers.

In another embodiment, the rotary drive comprises drive rollers or drive belts make up part of the contact surface for the empties. In this manner, the cams can be constructed, for example, as strips.

In a further embodiment, the conveyor device is constructed as a steep conveyor. In certain embodiments, the conveyor has an angle of incidence, α, of 60° to 85°. On the one hand, this reduces the structural depth of a return automatic. On the other hand, it largely prevents empties from lying on top of each other on one cam because the sharp angle causes excess empties to fall back into the input space.

BRIEF DESCRIPTION OF THE DRAWINGS

The invention is explained in detail in the following using exemplary embodiments. Wherever convenient, the same reference numbers will be used throughout the drawings to refer to the same or like parts. The associated drawing schematically show.

DETAILED DESCRIPTION

Figure 1:
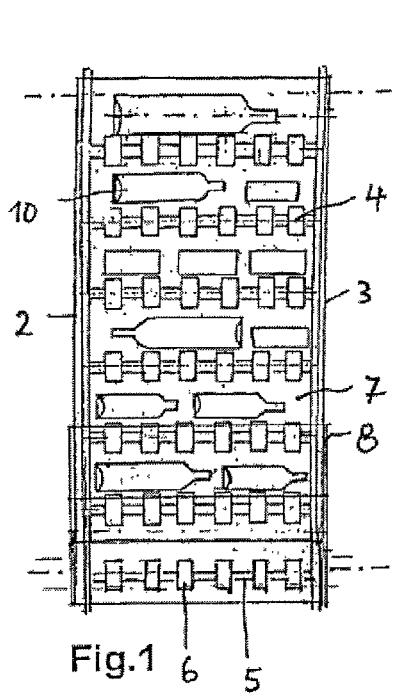
FIG. 1 a front view of a first exemplary conveyor device.
Figure 2:
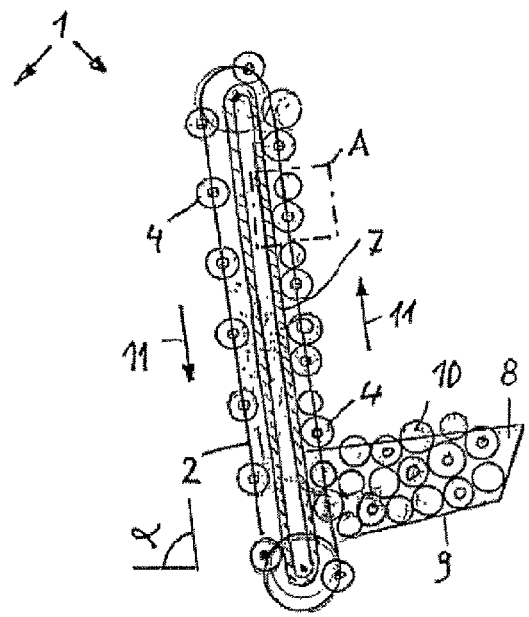
FIG. 2 a lateral view of the first exemplary conveyor device according to FIG. 1, FIG. 3 an enlarged detail drawing of section A of FIG. 2, FIG. 4 a perspective view of the conveyor device with sketched-in detection field of a camera belonging to a detection unit, FIG. 5 an enlarged detail drawing of a portion of the lateral view of a second embodiment of the invention, in a view similar to that of FIG. 3, FIG. 6 a top view of the second exemplary embodiment in accordance with FIG. 5, FIG. 7 an enlarged detail drawing of a portion of the lateral view of a third exemplary embodiment of the invention, in a view similar to that of FIG. 3, and FIG. 8 a top view of the third exemplary embodiment according to FIG. 7.

FIG. 1 is a schematic drawing show a steep conveyor 1 of an automatic system for the return of empties which is otherwise not shown in more detail. Cams 6 may have lesser and greater diameters. The α, or angle of incidence, of steep conveyor 1 is in a range of 60° to 85° in the exemplary embodiment as shown in FIG. 2. The steep conveyor comprises rotating chain drives 2, 3 on its two longitudinal sides on which chain drives rollers 4 arranged transversely to the direction of transport are rotatably supported. Rollers 4 are supported on chain drives 2 and 3 and are distributed at approximately uniform distances over the circumference and comprise alternating sections 5, 6 with lesser and greater diameters. Rollers 4 run at least on the top run of chain drives 2 and 3 on a rigid, stationary contact surface 7, with which they are rotatably driven by frictional contact.

The angle of incidence of α of the steep conveyor can be maximally 90°. In this case rollers 4 would have to have a diameter that is greater than the greatest diameter of the empties 10 to be transported.

A funnel-shaped input space 8, open at the top, is arranged at the lower end of steep conveyor 1. The bottom 9 of input space 8 is inclined downward toward steep conveyor 1. Empties 10, generally in the form of cans and bottles, may be input into input space 8 by being poured out, e.g., as loose material. As a result of the incline of bottom 9, a driving force is present, i.e., gravity, that allows empties 10 to roll and/or slide to steep conveyor 1. Rollers 4 of steep conveyor 1 run through input space 8, and as a result, empties 10 are carried into the system, lying on sections 6 with a greater diameter of rollers 4. Rollers 4 are wide enough to accommodate at least two items of empties on one roller 4, as is apparent from FIG. 1.

Figures 3, 4:
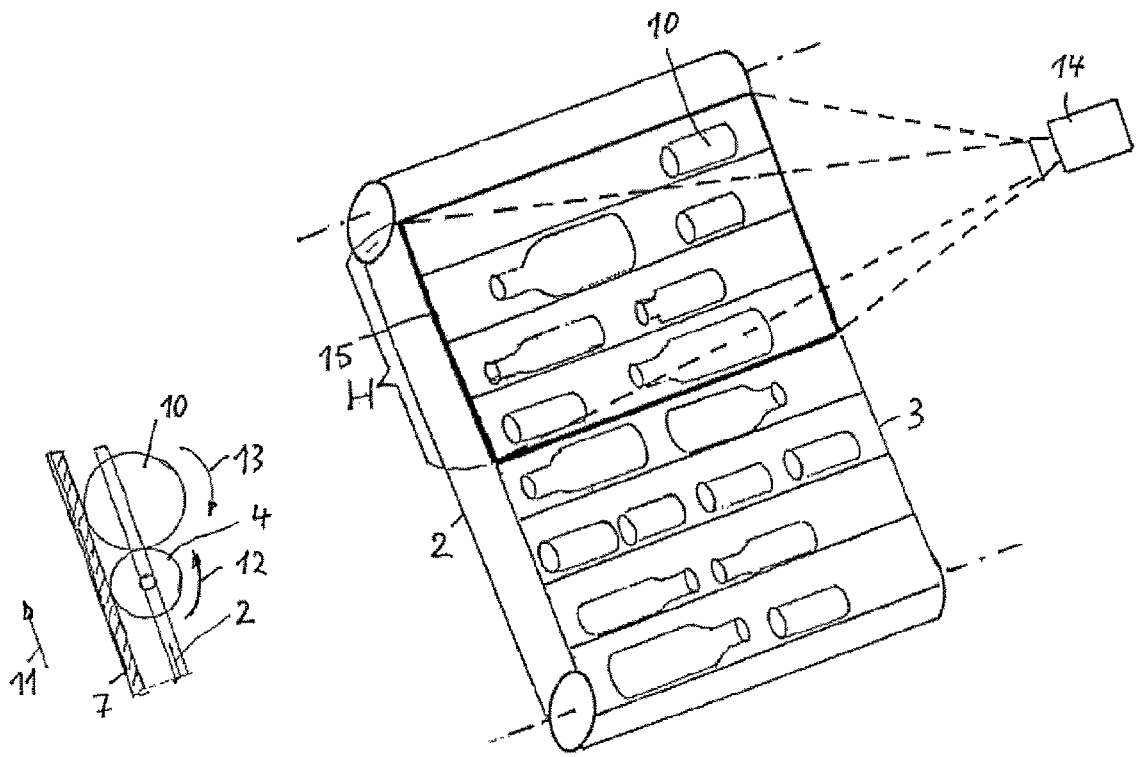

Steep conveyor 1 transports the empties 10 upward, out of input space 8. The direction of transport is represented in FIGS. 2 and 3 by arrow 11. Since rollers 4 roll off on contact surface 7, they receive a rotary impulse in the counterclockwise direction, as is represented in FIG. 3 by arrow 12. Empties 10 resting on rollers 4 are driven in a clockwise direction as a result, as is indicated in FIG. 3 by arrow 13. As a result of this direction of rotation, empties 10 are pressed against contact surface 7 so that they cannot fall down from rollers 4. On the upper end of steep conveyor 1, empties 10 are then transferred to further apparatuses (not shown) of the automatic return system.

Steep conveyor 1 guides empties 10 past a camera 14 of a detection unit, as is shown in FIG. 4, in which input space 8 and rollers 4 are not shown. Camera 14 has a detection field 15. This detection field 15 comprises the entire width of steep conveyor 1, and the height H of detection field 15 is selected in such a manner that it corresponds at least to the rolled-off jacket surface of empties 10 with the greatest diameter. This permits characteristic marks, barcodes or other illustrative features present on the jacket surface of an item of empties 10 to be reliably detected. Camera 14 is preferably arranged with an appropriate functional illumination and at a certain angle and a defined distance above steep conveyor 1 so that the camera can thus detect marks, etc. present on the surfaces of rotating empties 10 opto-electronically, and preferably in real time, during their upward transport. In addition, the entire arrangement can be monitored by a camera unit and its photographs used for purposeful service measures.

Figure 5:
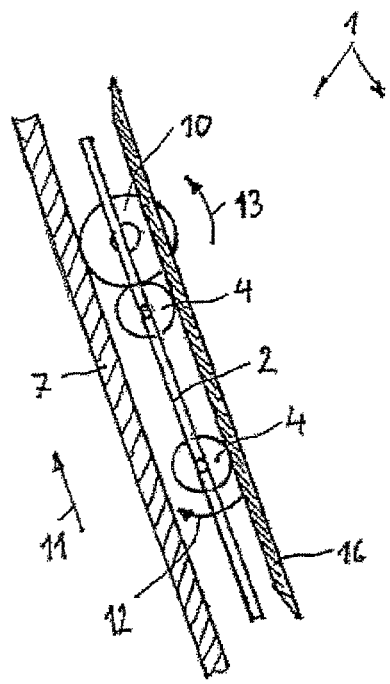
Figure 6:
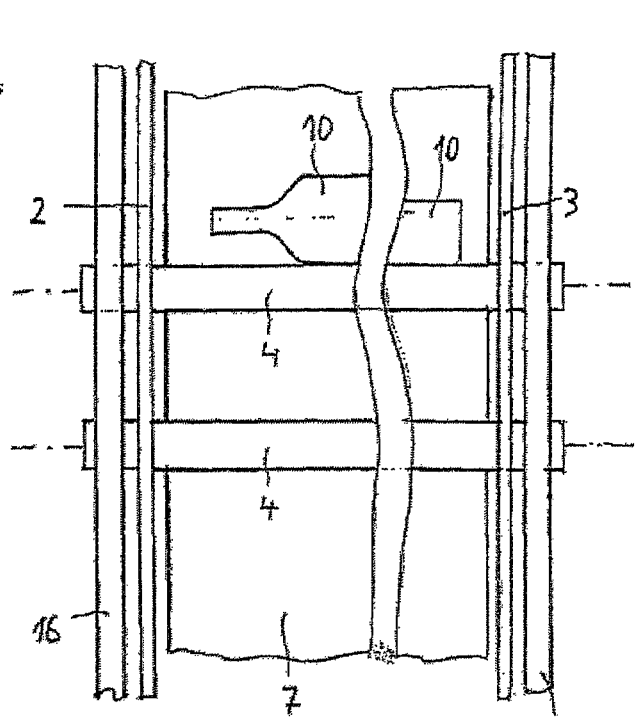

FIGS. 5 and 6 show a second exemplary embodiment. The steep conveyor 1 is similar in its main structure to that of the first exemplary embodiment. It therefore comprises a stationary, rigid contact surface 7 for empties 10, an input space 8 and rollers 4 functioning as cams that are rotatably supported in chain drives 2, 3 rotating around contact surface 7. In distinction to the first exemplary embodiment, the rollers 4 of the second exemplary embodiment shown in FIGS. 5 and 6 do not run on contact surface 7, but rather are above contact surface 7 and project, on both sides of surface 7, into the projecting areas Ü. The rollers 4 rotate as a result of frictional contact on rails 16 arranged in a stationary manner on both sides of contact surface 7 and on the opposite side of chain drives 2, 3. As a result of this arrangement, rollers 4 rotate in a clockwise direction and empties 10 resting on them accordingly rotate in the counterclockwise direction. This direction of rotation has the advantage, with the translatory transport of empties 10 and the associated change of the "viewing angle" of the camera, that empties 10 no longer have to completely rotate for a complete detection of barcodes and/or other characteristic marks on their jacket surfaces, i.e., the height H of detection field 15 of camera 14 is advantageously reduced compared to the first exemplary embodiment.

Figure 7:
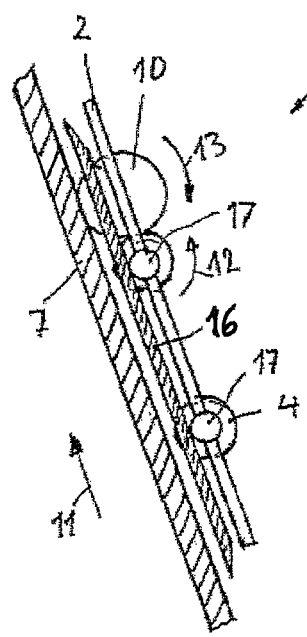
Figure 8:
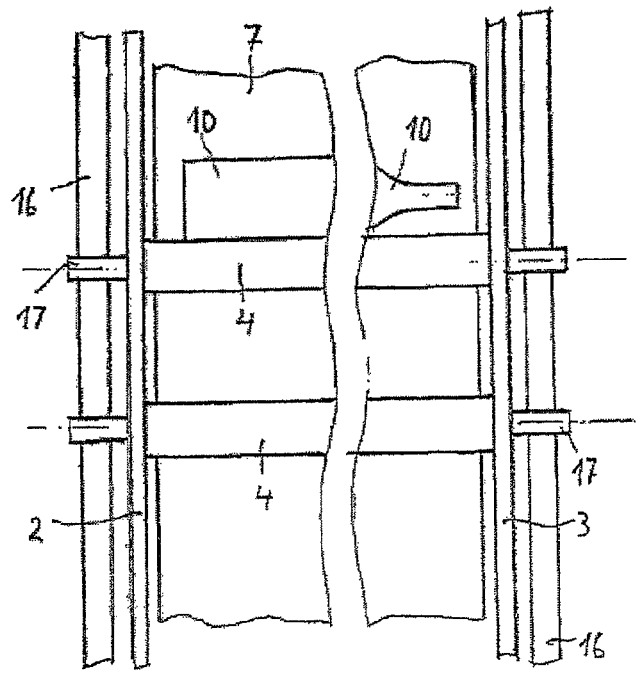

FIGS. 7 and 8 show another exemplary embodiment of the present invention. In distinction to the previously explained second exemplary embodiment for FIGS. 5 and 6, rails 16 are arranged in FIGS. 7 and 8 relative to chain drives 2 and 3, on the sides of contact surface 7. Rollers 4 again also project into projecting areas Ü, but in this embodiment, rollers 4 have pin-shaped extensions 17 that have a smaller diameter than rollers 4 in cam area M. With these extensions 17, rollers 4, raised from contact surface 7 for empties 10, roll on rails 16 with frictional contact. Rollers 4 have the same direction of rotation in this embodiment as in the first exemplary embodiment but, in contrast to the latter, have a higher circumferential speed on account of the "translation." As a result, the height H of detection field 15 is also shortened in this embodiment.

The invention claimed is:

1. A method for the return of empties, the method comprising:
   providing a system for the return of empties, the system including:
   a conveyor device having a direction of transport with a plurality of cams arranged transversely to the direction of transport, the cams including rollers having two sides;
   the conveyor device further comprising a contact surface for the empties, and the rollers being supported by chain drives rotating around the contact surface;
   frictional contact with the contact surface providing the rotary drive of the rollers;
   a detection unit, and at least one of the rollers is so broad that it is capable of receiving at least two of the empties side by side, and the empties receive a rotary impulse at least in a detection field of the detection unit, and the rotary impulse is parallel to the direction of transport of the empties, so that the empties rotate about their respective longitudinal axis when presented to the detection unit;
   moving the empties out of an input space in a parallelized manner using the conveyor device; and
   presenting the empties to the detection unit in a field array, the empties rotating about their longitudinal axis when presented to the detection unit.

2. A system for the return of empties, the system comprising:
   a conveyor device having a direction of transport with a plurality of cams arranged transversely to the direction of transport, the cams including rollers having two sides;
   the conveyor device further comprising a contact surface for the empties, and the rollers being supported by chain drives rotating around the contact surface;
   frictional contact with the contact surface providing the rotary drive of the rollers;
   a detection unit, and at least one of the rollers is so broad that it is capable of receiving at least two of the empties side by side, and the empties receive a rotary impulse at least in a detection field of the detection unit, and the rotary impulse is parallel to the direction of transport of the empties, so that the empties rotate about their respective longitudinal axis when presented to the detection unit.

3. The system of claim 2, wherein:
the conveyer device has an angle of incidence of 60° to 85°.

4. The system of claim 2, wherein:
the rollers are rotatably supported on the two sides by the chain drives.

5. The system of claim 2, wherein:
the conveyor device further comprises drive rollers, wherein the drive rollers provide for the rotary drive for the empties and the drive rollers are incorporated into the contact surface, and at least one of the cams comprises cleats.

6. The system of claim 2, wherein:
the conveyor device further comprises drive belts, wherein the drive belts provide for the rotary drive for the empties and the drive belts are incorporated into the contact surface for the empties, and at least one of the cam comprises cleats.

7. The system of claim 2, wherein:
the rollers project over the contact surface and rest on a plurality of rails in a projecting area, the rails being on the opposite side of the chain drives as the contact surface, and frictional contact with the rails provides the rotary drive of the rollers.

8. The system of claim 7, wherein:
the diameter of the rollers in the projecting area is smaller than the diameter of the rollers in the cam area.

9. The system of claim 2, wherein:
the rollers project over the contact surface and rest on a plurality of rails in a projecting area, the rails being on the opposite side of the chain drives as the contact surface, and the diameter of the rollers in projecting area is smaller than the diameter of the rollers in the cam area.

10. The system of claim 2, wherein:
the rollers are driven by a motor or engine.

11. The system of claim 2, wherein:
the rollers comprise alternating sections with lesser and greater diameters.

12. The system of claim 2, wherein:
positive locking with the contact surface provides the rotary drive of the rollers.

13. The system of claim 2, wherein:
the rollers project over the contact surface and rest on a plurality of rails in a projecting area, the rails being on the opposite side of the chain drives as the contact surface, and positive locking with the rails provides the rotary drive of the rollers.

14. The system of claim 2, wherein:
the rollers project over the contact surface and rest on a plurality of rails in a projecting area, the rails being on the same side of the chain drives as the contact surface, positive locking with the rails provides the rotary drive of the rollers, and the diameter of the rollers in the projecting area is smaller than the diameter of the rollers in the cam area.

15. The system of claim 4, wherein:
the conveyer device has an angle of incidence of 60° to 85°.

16. The system of claim 5, wherein:
the conveyer device has an angle of incidence of 60° to 85°.

17. The system of claim 6, wherein:
the conveyer device has an angle of incidence of 60° to 85°.

18. The system of claim 7, wherein:
the rollers comprise alternating sections with lesser and greater diameters.

19. The system of claim 7, wherein:
the conveyer device has an angle of incidence of 60° to 85°.

20. The system of claim 8, wherein:
the rollers comprise alternating sections with lesser and greater diameters.

21. The system of claim 8, wherein:
the conveyer device has an angle of incidence of 60° to 85°.

22. The system of claim 9, wherein:
the rollers comprise alternating sections with lesser and greater diameters.

23. The system of claim 9, wherein:
the conveyer device has an angle of incidence of 60° to 85°.

24. The system of claim 10, wherein:
the rollers comprise alternating sections with lesser and greater diameters.

25. The system of claim 10, wherein:
the conveyer device has an angle of incidence of 60° to 85°.
26. The system of claim 11, wherein:
the conveyer device has an angle of incidence of 60° to 85°.
27. The system of claim 12, wherein:
the rollers comprise alternating sections with lesser and greater diameters.
28. The system of claim 12, wherein:
the conveyer device has an angle of incidence of 60° to 85°.
29. The system of claim 13, wherein:
the rollers comprise alternating sections with lesser and greater diameters.
30. The system of claim 13, wherein:
the conveyer device has an angle of incidence of 60° to 85°.
31. The system of claim 14, wherein:
the rollers comprise alternating sections with lesser and greater diameters.
32. The system of claim 14, wherein:
the conveyer device has an angle of incidence of 60° to 85°.
33. The system of claim 14, wherein:
the conveyer device has an angle of incidence of 60° to 85°.
34. The system of claim 18, wherein:
the conveyer device has an angle of incidence of 60° to 85°.
35. The system of claim 20, wherein:
the conveyer device has an angle of incidence of 60° to 85°.
36. The system of claim 24, wherein:
the conveyer device has an angle of incidence of 60° to 85°.
37. The system of claim 27, wherein
the conveyer device has an angle of incidence of 60° to 85°.
38. The system of claim 29, wherein:
the conveyer device has an angle of incidence of 60° to 85°.
39. The system of claim 31, wherein:
the conveyer device has an angle of incidence of 60° to 85°.
40. The system of claim 4, wherein:
the rollers are driven by a motor or engine.
41. The system of claim 4, wherein:
the rollers comprise alternating sections with lesser and greater diameters.
42. The system of claim 4, wherein:
positive locking with the contact surface provides the rotary drive of the rollers.
43. The system of claim 4, wherein:
the rollers project over the contact surface and rest on a plurality of rails in a projecting area, the rails being on the opposite side of the chain drives as the contact surface, and positive locking with the rails provides the rotary drive of the rollers.
44. The system of claim 4, wherein:
the rollers project over the contact surface and rest on a plurality of rails in a projecting area, the rails being on the same side of the chain drives as the contact surface, positive locking with the rails provides the rotary drive of the rollers, and the diameter of the rollers in the projecting area is smaller than the diameter of the rollers in the cam area.

\* \* \* \* \*